United States Patent [19]
Hellerstein

[11] Patent Number: 5,996,090
[45] Date of Patent: Nov. 30, 1999

[54] METHOD AND APPARATUS FOR QUANTITATIVE DIAGNOSIS OF PERFORMANCE PROBLEMS USING EXTERNAL REPRESENTATIONS

[75] Inventor: Joseph L. Hellerstein, Ossining, N.Y.

[73] Assignee: International Business Machines Corporation, Armonk, N.Y.

[21] Appl. No.: 08/959,828

[22] Filed: Oct. 29, 1997

[51] Int. Cl.$^6$ .................................................. G06F 11/00
[52] U.S. Cl. ................................................................ 714/25
[58] Field of Search ................................. 395/50, 54, 60; 714/25, 26, 30, 31, 46, 47, 712

[56] References Cited

U.S. PATENT DOCUMENTS

| | | | |
|---|---|---|---|
| 5,261,086 | 11/1993 | Shiramizu | 714/26 |
| 5,394,556 | 2/1995 | Oprescu | 709/220 |
| 5,412,802 | 5/1995 | Fujinami et al. | 714/26 |
| 5,428,619 | 6/1995 | Schwartz et al. | 714/712 |
| 5,551,037 | 8/1996 | Fowler et al. | 709/300 |
| 5,598,511 | 1/1997 | Petrinjak et al. | 395/50 |
| 5,636,344 | 6/1997 | Lewis | 709/224 |
| 5,673,385 | 9/1997 | Mack et al. | 714/36 |
| 5,680,541 | 10/1997 | Kurosu et al. | 714/47 |

*Primary Examiner*—Robert W. Beausoliel, Jr.
*Assistant Examiner*—Pierre Eddy Elisca
*Attorney, Agent, or Firm*—Kevin M. Jordan; Anne Vachon Dougherty

[57] ABSTRACT

A method and apparatus are described for building diagnostic systems for performance problems in computer and communications systems. The diagnostic system outputs explanations that quantify contributions to performance problems, such as "90% of the increase in response time is due to increased LAN traffic." The preferred embodiment comprises: (1) a representation of the target system as a directed acyclic graph; (2) diagnostic techniques that compute numerical weights for arcs in the directed graph; and (3) a diagnosis engine that uses the directed graph and arc weights to output quantitative performance diagnoses. Nodes in the directed graph are measurement variables in the target system. Arcs in the graph indicate functional dependencies between measurement variables. Arc weights indicate the contribution of a child variable to performance problems manifested in the parent variable. The diagnosis engine searches the directed graph to find paths with the largest explanatory power, as computed from the arc weights.

12 Claims, 16 Drawing Sheets

FIG.9

| PATH | uP |
|---|---|
| RTTOT → SJCCPU → STCPU → STCPU_1 | .22 |
| RTTOT → SJCPU → TRCPU | .06 |
| RTTOT → SJIO → STIO → SJCHN | .05 |
| RTTOT → SJIO → STIO → SJDISK → SJDISK_1 | .05 |
| RTTOT → SJIO → STIO → SJDISK → SJDISK_M → STDISK_M | .07 |
| RTTOT → SJPAGE → STIO → SJCHN | .07 |
| RTTOT → SJPAGE → STIO → SJDISK → SJDISK_1 → STDISK_1 | .06 |
| RTTOT → SJPAGE → STIO → SJDISK → SJDISK_M → STDISK_M | .09 |
| RTTOT → SJPAGE → TRPAGE → TRPAGE_1 | .24 |
| TOTAL | .91 |

FIG.11

| PARENT VARIABLE | DIAGNOSTIC TECHNIQUE |
|---|---|
| RTTOT | BA |
| SJCPU | CA |
| SJIO | CA |
| SJPAGE | CA |
| STIO | WDA |
| SJCHN | BA |
| SJCU | BA |
| SJDISK | BA |
| SJCH_1 | CA |
| SJCH_K | CA |
| SJCU_1 | CA |
| SJCU_L | CA |
| SJDISK_1 | CA |
| SJDISK_M | CA |

BA = BOTTLENECK ANALYSIS
CA = CORRELATION ANALYSIS
WDA = WHAT'S-DIFFERENT ANALYSIS

| METHOD NAME | RETURNED TYPE | ARGUMENT TYPES |
|---|---|---|
| Constructor | | MNG, ParentVarialbe |
| addProblemData | | Array of numbers |
| addReferenceData | | Array of numbers |
| computeArcWeight | ArcWeight | ChildVariable |

| DATA MEMBER | DESCRIPTION |
|---|---|
| parentVariable | Non-leaf variable to which the object corresponds |
| childVariableList | List of children of the parent variable |

FIG.12

METHOD AND APPARATUS FOR QUANTITATIVE DIAGNOSIS OF PERFORMANCE PROBLEMS USING EXTERNAL REPRESENTATIONS

FIELD OF THE INVENTION

The present invention relates generally to diagnosing the performance of computer and communications systems and more particularly to the quantitative assessment of contributions to performance problems in such systems.

BACKGROUND OF THE INVENTION

A critical element of operations and management is managing performance problems, such as addressing long response times in client-server systems and low throughputs for nightly database updates. Such considerations require mechanisms for detecting, diagnosing, and resolving performance problems. Detection uses one or more measurement variables to sense when a problem occurs, such as using on-line change-point detection algorithms to sense changes in client-server response times. Diagnosis isolates problems to specific components so that appropriate actions can be identified, such as attributing large client-server response times to excessive LAN utilizations. Resolution selects and implements actions that eliminate the problem, such as increasing LAN capacity or reducing LAN traffic.

Diagnosis is done for a target system, which may be an individual computer, a network of computers, or a combination of the two. Diagnosis requires extracting measurement data. Some of these data are collected during the time when a performance problem is present. These are referred to as problem data. Additional data may be used as well to obtain reference values for measurement variables. These are called reference data. Reference data may be measurements of the target system when no performance problem is present, values summarized from such measurements (e.g., distribution quantiles), or values obtained from manufacturer specifications (e.g., disk access times).

The present invention addresses quantitative performance diagnosis (QPD). A quantitative performance diagnosis consists of a set of explanations and a quantification of their importance. Ideally, this quantification takes the form of fractional contributions to the performance problem. For example, a QPD might attribute 5% of the performance problem to the explanation that the 30% increase in web server traffic accounts for 90% of the increase in LAN utilization, which in turn accounts for 20% of the increase in client-server response times.

Two benefits accrue from employing quantitative diagnoses rather than qualitative diagnosis. First, the importance of factors affecting performance can be ranked. With ranking, analysts and administrators can quickly focus on the most important problem causes. Secondly, quantitative information is often needed to specify not only the actions, but also the amount of the actions (e.g., by how much must the LAN capacity be increased, or by how much LAN traffic must be reduced) required to resolve the performance problems.

Vendors of diagnostic systems can increase their code reuse (and hence their profits) by employing an architecture that enables their diagnostic system to adapt for the diagnosis of many target systems. Examples of target systems include: operating systems (e.g., Windows 95, AIX, and MVS), database management systems (e.g., DB/2, Sybase, Informix), collaborative middleware (e.g., Lotus Notes and Netscape web browsers), and communications software (e.g., TCP/IP, APPC, SNA). Ideally, the diagnostic system is structured so that only a small, isolated fraction of code need be modified to handle new target systems.

Better still is an architecture that allows end-users of the diagnostic system to represent special characteristics of their environment, such as installation-specific measurement data that can be employed in QPD. Meeting this requirements is more demanding since the diagnostic system must be structured so that representations of the target system are externalized in a way that permits end-user modification without compromising the effectiveness of the vendor's software.

Numerous applications have been developed in the broad area of interpreting data (e.g., U.S. Pat. No. 5,598,511 of Petrinjak et al.) and more specifically for diagnosing performance problems in computer and communications systems. The most common approach employs hand-crafted if-then rules (e.g., U.S. Pat. No. 5,636,344 of Lewis). Systems using customized if-then rules produce qualitative diagnoses, such as "large response times are due to excessive LAN utilization." This approach requires diagnostic systems for which knowledge of the target system must be embedded in them.

When the diagnosis engine embeds the choice of diagnostic technique, the design makes the diagnostic system more difficult to adapt to new target systems, and the design limits the extent to which end-users can customize the diagnostic system.

Ease of adaptation and end-user customization is improved by employing an external representation of the target system. Some applications have attempted an external architecture by externalizing the if-then rules employed. For example, U.S. Pat. No. 5,261,086 of Shiramizu et al provides know-how and declarative rules; U.S. Pat. No. 5,412,802 of Fujinami et al employs cases, rules, and heuristics; and, U.S. Pat. No. 5,428,619 of Schwartz et al. has components for network topology, cases, and a diagnosis tree. Related work in fault diagnosis considers external models of the system, such as failure modes, qualitative models of system behavior, and fault trees. It is to be noted that none of the aforementioned systems employs external representations that are sufficient to provide quantitative performance diagnosis.

Analytic techniques are used for fault detection and diagnosis in technical processes wherein system behavior is expressed in terms of a set of equations. The approach entails: (a) computing the difference between expected and observed values of variables (referred to as residuals) and (b) employing techniques to assess the significance of the residuals. While this analytic approach employs an external representation of the target system, its application to performance diagnosis has a fundamental deficiency, in that the methodology does not quantify contributions to performance degradation. Instead, the prior art analytic approach assesses the probability of a binary event such as the failure of a component.

Some have approached QPD by using custom-tailored analytic models. However, doing so results in the same kind of system dependencies as with hand-crafted rules. Another approach is to externalize quantitative relationships present in the target system. To date, QPD algorithms taking this approach have employed representations of the target system that consist of tree-structured algebraic relationships between measurement variables.

There are several drawbacks to the existing systems that employ tree-structured algebraic relationships. Firstly, the specifics of the art limit its applicability for QPD (e.g., a system developed for application in explaining financial models will be limited to the domain of financial planning). Secondly, tree-structured representations of target systems are quite restrictive. In particular, multi-parent dependencies arise when shared services are present, thereby necessitating a directed acyclic graph (DAG) that cannot be represented as a tree. Shared services are a key element of modern computer and communications systems. Examples include having multiple clients share a server process and having multiple server processes share host resources such as communications buffers. Extending tree-structured representations to ones that employ directed acyclic graphs is not straigthforward for QPD. In particular, care must be taken to avoid double-counting the contributions of measurement variables (since there may be multiple paths from the detection variable to leaves in the graph).

Finally, a third drawback to prior art diagnosis systems relates to quantifying the effects of performance problems on measurement variables. Such quantification is an essential part of QPD. Several diagnostic techniques have been proposed:

(a) finding the variable with the largest value;
(b) finding the variable whose value changed the most; or
(c) finding the variable that has the largest absolute value for its cross correlation with another variable.

Weighted graphs are widely used in computer systems, such as for use in determining routing distances. Further, many have discussed the construction of algorithms employing graphical representations of systems and weighted graphs. In addition, existing algorithms for qualitative performance diagnosis employ graph representation. However, to those skilled in the art, it is not obvious how to transform qualitative performance diagnosis into an algorithm involving the navigation of a weighted graph.

What is needed, therefore, is a diagnosis engine that uses external representations of diagnostic techniques to control the quantification of performance problems on measurement variables.

SUMMARY OF THE INVENTION

Building adaptable systems for QPD requires external representations of key information. The present invention addresses two kinds of information: dependencies between measurement variables and diagnostic techniques. The present invention employs two architectures. In both, the target system is represented as a measurement navigation graph (MNG). An MNG is a directed acyclic graph (DAG), not just a tree. Nodes in the MNG represent measurement variables; arcs in the MNG indicate relationships between measurement variables. The second architecture also uses an external representation of diagnostic techniques, wherein one diagnostic technique is specified for each non-leaf node, with the technique being applied to all measurement variables incident to arcs emanating from that non-leaf node.

The diagnosis engine operates by: (1) inputting the external representations; (2) inputting a quality of service variable that is used as a starting point for the diagnosis of the target system; (3) searching paths in the MNG that provide the most explanatory power, as computed from the arc weights; and (4) outputting those paths that have the largest explanatory power. Note that in step (3) the same arc may be used in multiple paths since the algorithm takes into account paths that are shared between problem causes.

The aforementioned architectures and external representations provide a significant advance beyond existing art. First, an adaptable approach to QPD is provided for a broader class of target systems. In particular, by allowing DAG representations of target systems instead of restricting these representations to trees, our approach is applicable to client server applications that have shared resources (e.g., web servers). Second, by employing the second architecture, designers of diagnostic systems (and potentially end-users as well) gain more control over the manner in which diagnosis is done.

The method and system address quantitative diagnosis using a mechanism that separates structural knowledge and diagnostic knowledge from the diagnosis engine. In addition to diagnosing performance, the invention may be used more broadly, such as diagnosing availability problems in networked systems or determining the cause of poor corporate performance based on financial statements.

BRIEF DESCRIPTION OF DRAWINGS

FIG. 9 illustrates the results of applying an implementation of the QPD method to the described example in FIG. 7.

FIG. 11 illustrates how diagnostic techniques can be specified externally using a simple tabular structure.

FIG. 12 details the methods and data members of a class whose objects represent diagnostic techniques.

DETAILED DESCRIPTION OF THE PREFERRED EMBODIMENT

Figure 1:
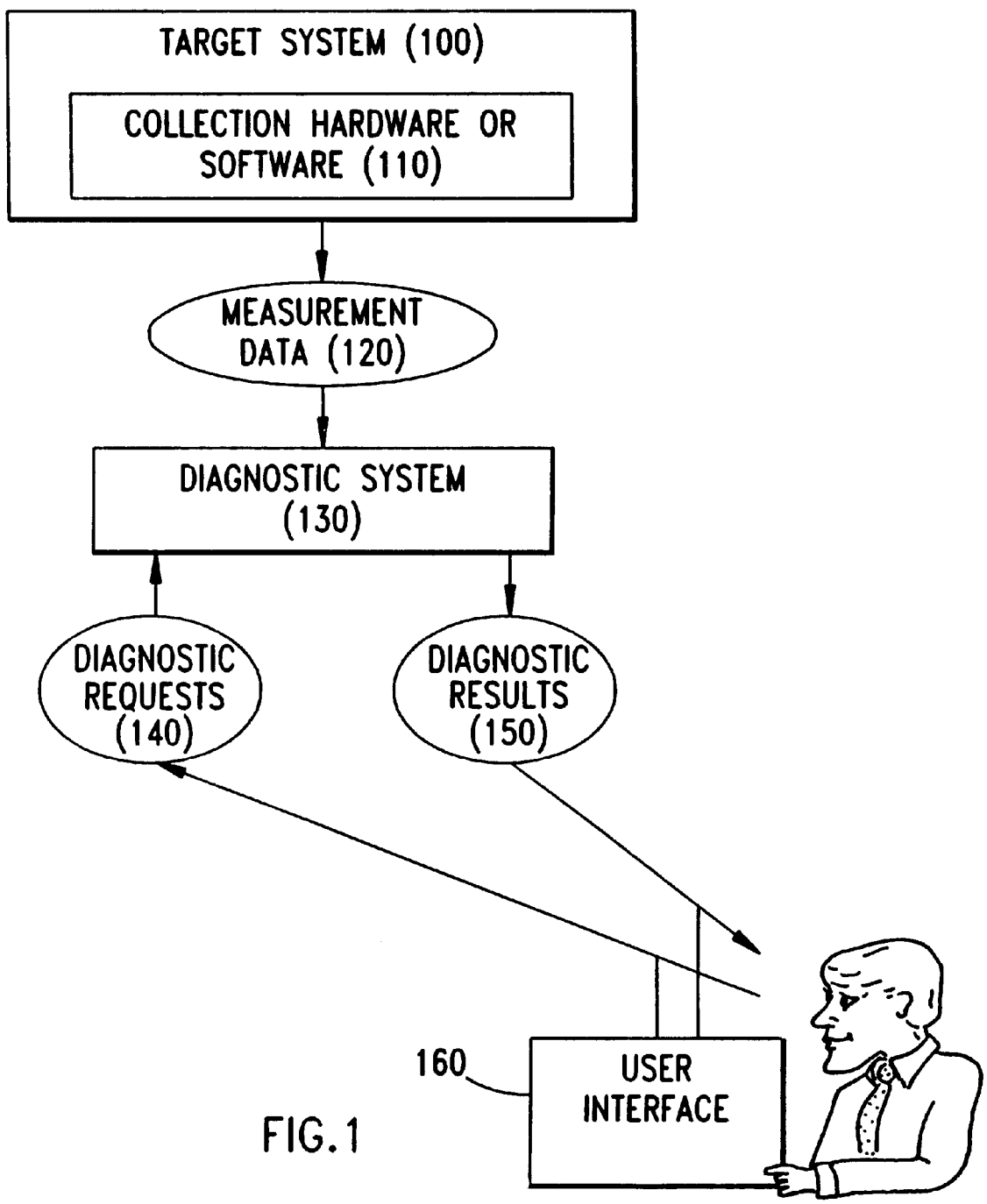
FIG. 1 displays the structure in which a diagnosis system operates.

FIG. 1 depicts an overall architecture for quantitative performance diagnosis (QPD). The target system (100) is a computer, data network, or combinations of both from which measurement data (120) are obtained via collection hardware or software (110). For example, the target system may be a host running the Unix operating system; the measurement data may contain information about queue lengths and read buffers; and the collection software might be the Unix system activity reporter (sar). A diagnostic system (130) takes as inputs measurement data and diagnostic requests (140) from the end user (160). The diagnostic system outputs diagnostic results (150) in the form of quantitative performance diagnoses.

Two architectures are considered for the diagnostic system. In the first, the target system is represented as an MNG and the diagnosis engine embeds one or more diagnostic techniques. The second architecture extends this structure to include diagnostic techniques that are specified externally instead of being embedded in the diagnosis engine.

Figure 2:
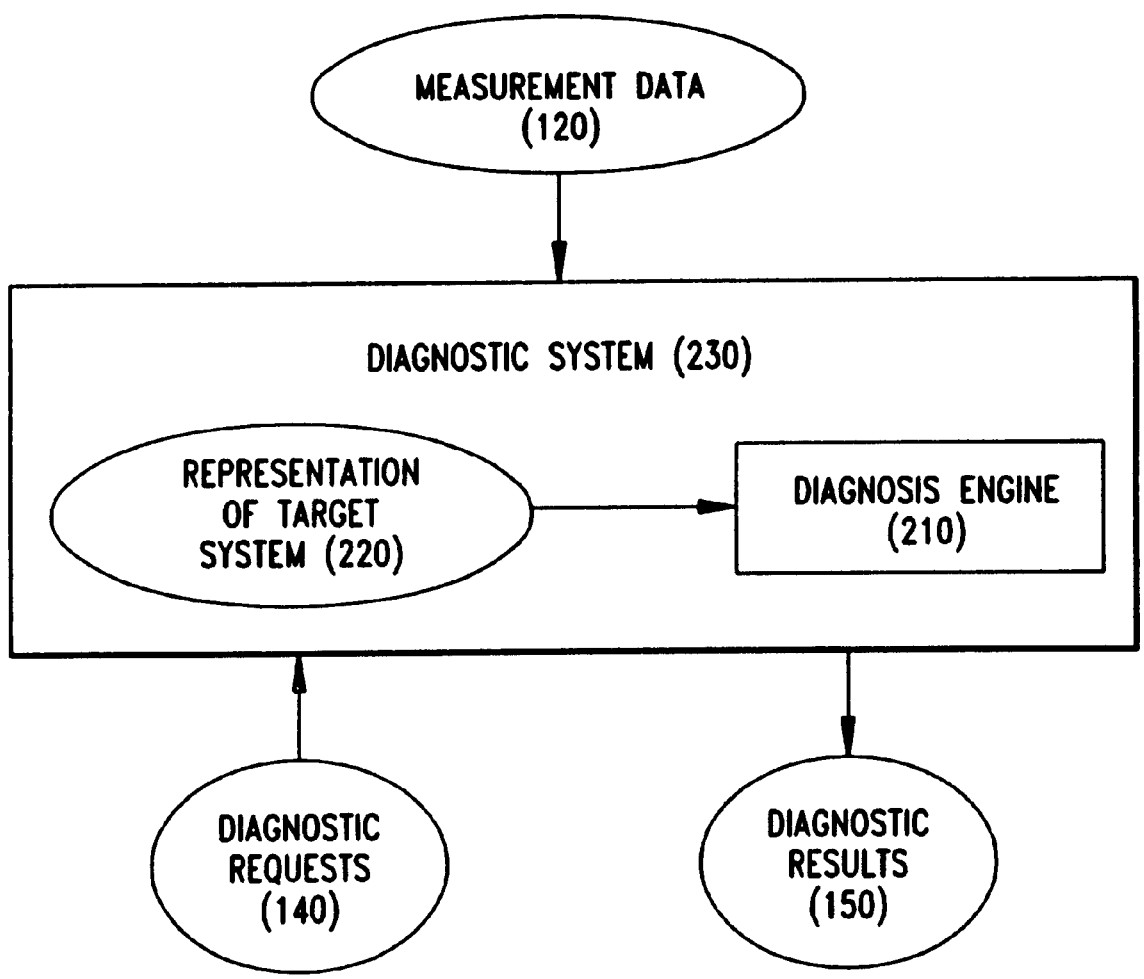
FIG. 2 shows a first architecture considered for a diagnosis system in which the representation of the target system is externalized as an MNG.

The first architecture, as depicted in FIG. 2, employs an external representation of the target system (220), as noted above. In the FIG. 2 architecture, the diagnostic system (230) has a diagnosis engine (210) that reads and interprets the representation of the target system in order to accomplish its function of outputting diagnostic results (150).

Figure 4:
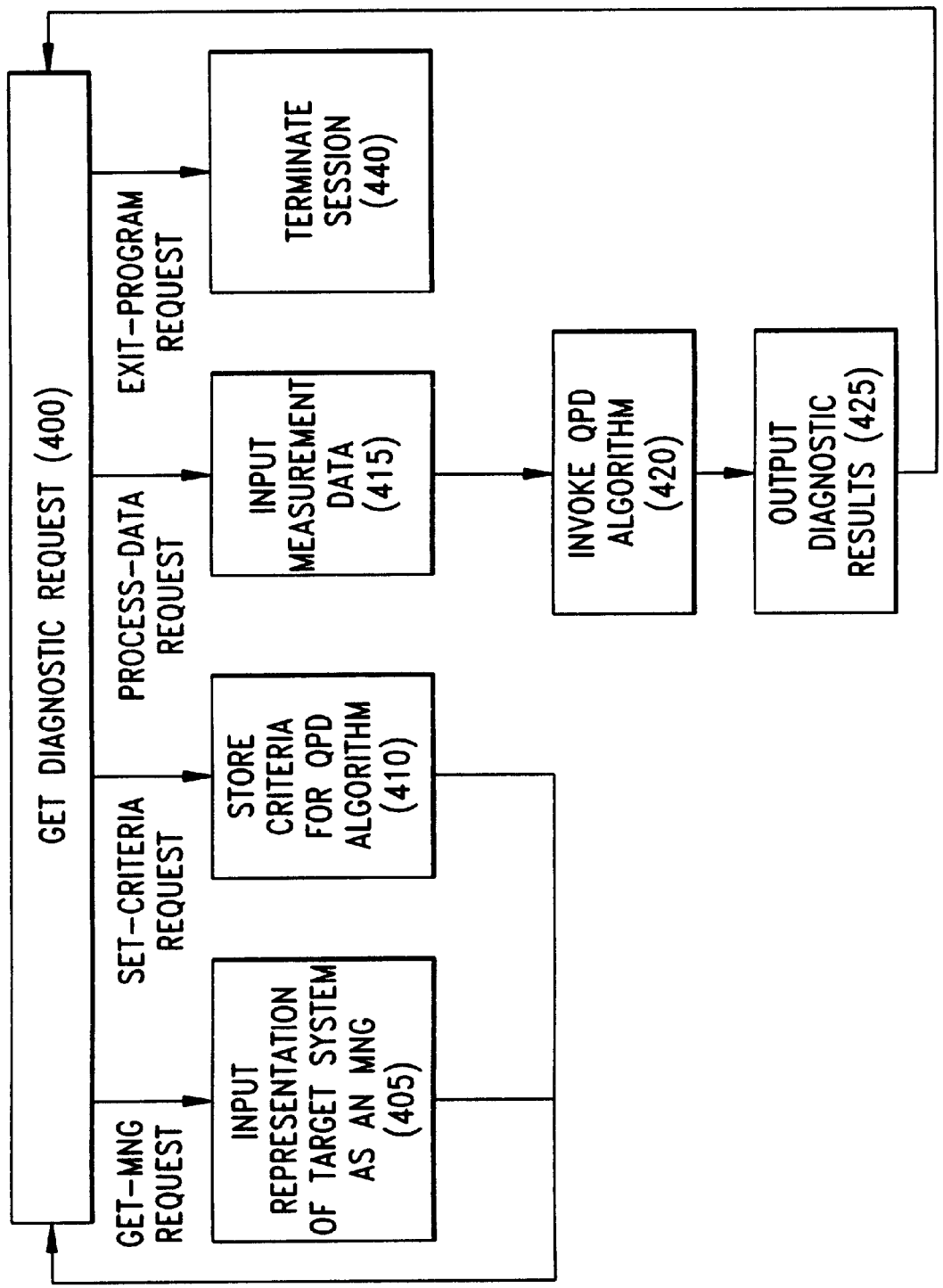
FIG. 4 specifies the method used in the FIG. 2 architecture.

FIG. 4 specifies the method by which the diagnosis engine in the FIG. 2 architecture operates. In (400), a diagnostic request that was input from the end-user is processed. What happens next depends on the nature of the diagnostic request. A get-MNG request specifies that an MNG is to be input, which is handled in (405). That an MNG is employed is an advance in the state-of-the-art in that target systems are not restricted to tree-structured representations. A set-criteria request specifies that the end-user is indicating the criteria by which the QPD process operates, which is handled by saving these inputs (at (410)). A process-data request causes measurement data to be input (415), the QPD process to be invoked (420), and the diagnostic results to be output (425). An exit-program request terminates the diagnosis session (440).

Observe that (400), (410), (415), and (440) involve straightforward programming techniques for user interfaces, program control, and data access. Step (425) is also straightforward once the outputs of the QPD process are fully specified. Similarly, step (405) is straightforward once the MNG has been specified.

With reference to FIG. 4, the MNG representation, the QPD process flow as used in (420), and the diagnostic results will be described. To facilitate this, a running example will be utilized to illustrate the nature of performance problems and their diagnosis. The example is based on data from a production computer installation at a large telecommunications company that uses a mainframe computer to provide interactive time sharing to several hundred engineers, scientists, and secretaries. Quality of service for such a system would logically be characterized by average response time, which is denoted by RTTOT.

Figure 5:
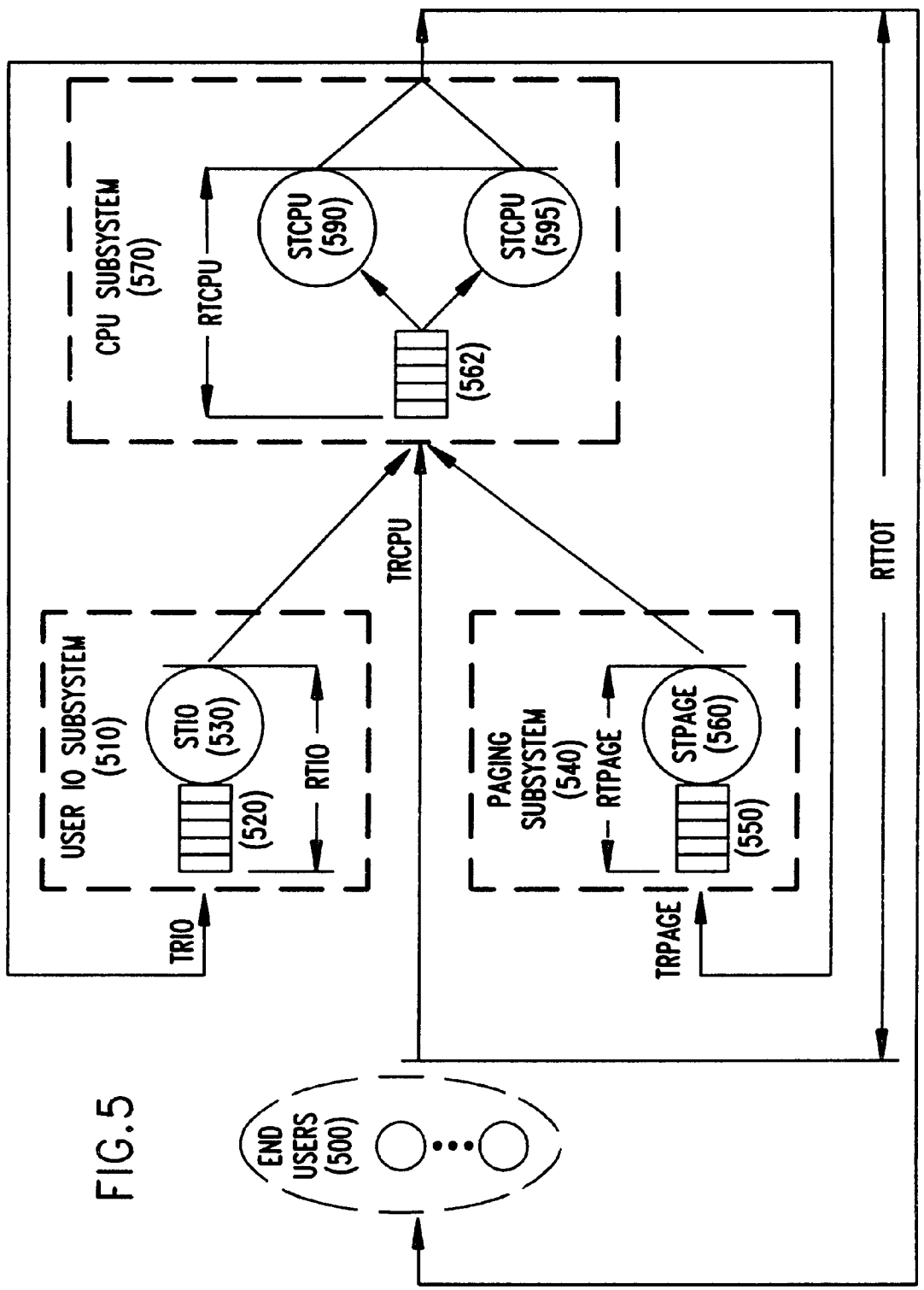
FIG. 5 displays a queuing diagram for the time sharing system that is used in the described example.

FIG. 5 displays a queuing diagram for the running example. In this diagram, end-users (500) initiate transactions (e.g., by pressing the Enter key), which results in requests to the CPU subsystem (570). Following this, there may be requests for the paging (540) and/or user IO subsystems (510), which in turn may be followed by other requests for the CPU subsystem. Each subsystem has one or more servers (530, 560, 590, 595) and a queue (520, 550, 560). In the figure, there are annotations that indicate measurement variables for response times, service times, and request rates at each queue. Response time variables begin with RT, such as RTTOT. Service time variables have the prefix ST, and transaction rate variables start with TR. Further, let N_CPU, N_IO, and N_PAGE denote the number of subsystem visits per user transaction. The quantity (N_CPU)(RTCPU) is the sojourn time for CPU subsystem, which is denoted by SJCPU. A similar notation is used for sojourn times for the IO and paging subsystems. So, $$RTTOT=(N\_CPU)(RTCPU)+(N\_IO)(RTIO)+(N\_PAGE)(RTPAGE)+RTOTHER$$

$$=SJCPU+SJIO+SJPAGE+RTOTHER,$$

where RTOTHER is included to handle time not otherwise accounted for.

Figure 6:
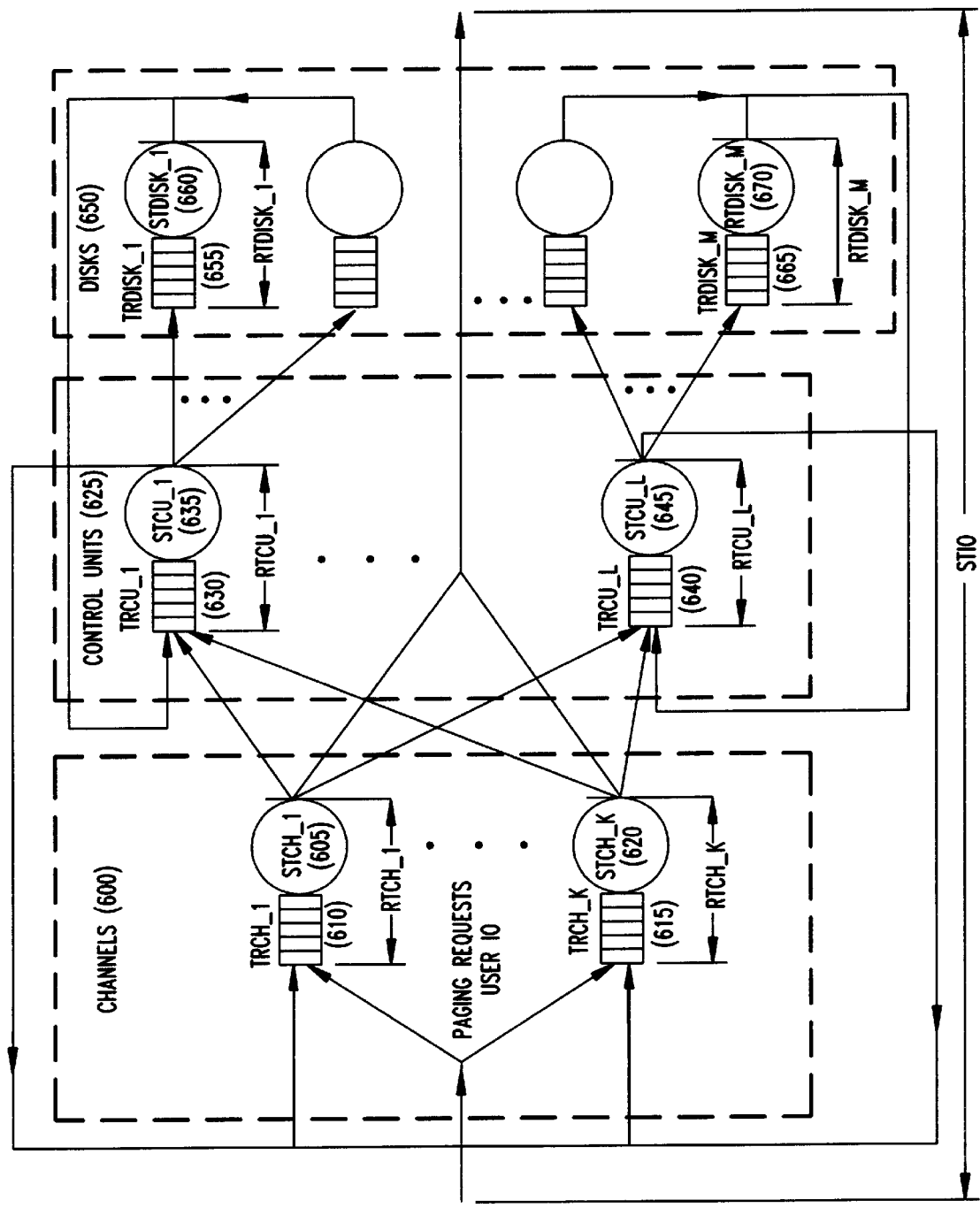
FIG. 6 displays a queuing diagram for the input/output subsystem of the time sharing system that is used in the described example.

As characterized, service times for user IO and paging are actually response times for another queuing network, the IO subsystem, which is depicted in FIG. 6. The forward flow in FIG. 6 is from the channel subsystem (600) to the control unit subsystem (625) to the disk subsystem (650). Each subsystem has one or more servers (605, 620, 635, 645, 660, 670) and one or more queues (610, 615, 630, 640, 655, 665). There is also a backward flow that reverses the foregoing. As in FIG. 5, there are annotations for variable names that use the RT, ST, and TR prefixes.

Having described the running example, the representation and construction of MNG's will now be discussed. An MNG is a directed acyclic graph in which nodes are measurement variables and arcs reflect functional relationships. Note that employing a DAG representation of the target system (as opposed to a tree representation) has a significant impact on the form of the diagnostic results and hence the QPD process flow. In a tree representation, each measurement variable (which is represented as a node in the MNG) is contained in one path from the variable that quantifies service levels, which is the root of the tree. Thus, only one path is considered when determining the contribution of a measurement variable to the performance problem. In contrast, for a DAG, there may be multiple paths from the root to a measurement variable. Hence, care must be taken to avoid over-counting or under-counting the contributions of a measurement variable to performance problems. Moreover, it is to be noted that an MNG can be represented in many ways, such as rules, tables, and special grammars. To one skilled in the art, any representation of non-cyclic dependencies between measurement variables is equivalent to an MNG. In addition, an MNG representation of the target system may be inferred from other information. For example, representations of connections between computing elements (topology data) in combination with representations of element configuration (e.g., what software and applications are running on the elements) can be combined to construct an MNG. Further, a complex target system may be represented as several MNG's. Also, the MNG may be constructed dynamically and incrementally.

Figure 7:
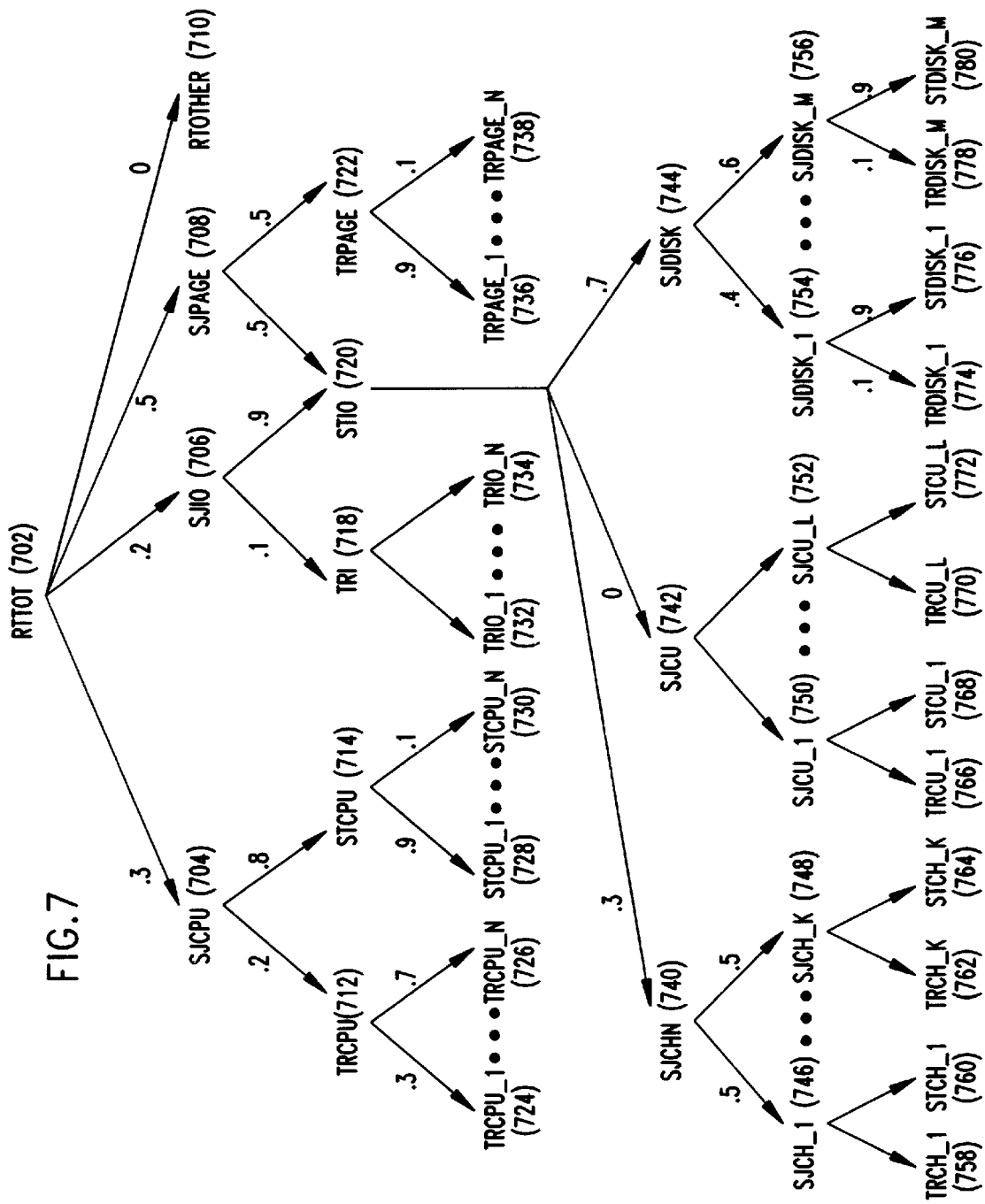
FIG. 7 displays a measurement navigation graph for the described example.

FIG. 7 displays an MNG for the system in the described example. The MNG diagrams are constructed from equations such as the one above, and from queuing diagrams such as FIG. 5 and FIG. 6. For example, in the equation above, RTTOT appears on the left-hand side and SJCPU, SJIO, SJPAGE, RTOTHER are on the right-hand side. So, the MNG has arcs from RTTOT (702) to SJCPU (704), SJIO (706), SJPAGE (708), and RTOTHER (710). From the queuing diagram in FIG. 5, time spent in the CPU subsystem is determined by STCPU (714) and TRCPU (712). Thus, the MNG has arcs from SJCPU to STCPU and from SJCPU to TRCPU. The remaining nodes (718 through 780) and arcs in the MNG are obtained in a similar manner.

Note that FIG. 7 is not a tree since STIO has two parents. This is a consequence of the I/O subsystem being shared between the paging and user input/output subsystems. As a result, the latter two subsystems both have STIO as their service times STIO.

The foregoing observation about STIO indicates that a tree representation of the target system is not sufficient. Instead, a DAG representation is required. Indeed, it is expected to be frequently the case that an MNG has nodes with multiple parents, thereby requiring a DAG representation. To see why, note that having shared services cannot be represented by a tree structure, as evidenced by the STIO example. Further, shared services are an integral part of widely-used architectures such as client-server systems. For example, multiple clients typically share a server process, and server processes often share operating system facilities such as database access and network communication.

Some notation that is used in the QPD process flow includes $x(i)$, which denotes a measurement variable. The notation $x(0)$ is the variable from which diagnosis begins, which is referred to as the detection variable. An arc from $x(i)$ to $x(j)$ is indicated by the ordered pair $(x(i),x(j))$. A path from $x(i)$ to $x(j)$ is defined recursively as: $P(i,j)=(x(i), x(k))$ union $P(k,j)$, where $P(k,j)$ is a path from $x(k)$ to $x(j)$ (or the empty set if k=j). In general, a path is denoted by using P without qualification. $PP(i,j)$ is the set of all paths from $x(i)$ to $x(j)$. The descendants of $x(i)$ are those nodes that can be reached from $x(i)$.

The QPD process flow uses an MNG that is annotated with arc weights that quantify the contribution of child variables to performance problems manifested in their parents. The weights are obtained from diagnostic techniques, such as those described below. For example, in FIG. 7, a diagnostic technique would use measurement data to quantify the effect on RTTOT of performance problems in SJCPU, SJIO, SJPAGE, and RTOTHER. The weight of the arc $(x(i),x(j))$ is denoted by $w(i,j)$. To provide the semantics of fractional contribution to performance problems, $w(i,j)$ is between 0 and 1 (inclusive).

In the FIG. 2 architecture, diagnostic techniques are assumed to be embedded in the QPD process flow. Let $x(j)$ be a child of $x(i)$. Further, let $avg(k)$ be the average value of $x(k)$ in the problem data, and let $avg'(k)$ be the reference value for $x(k)$. Examples of diagnostic techniques are:

(a) what's-biggest analysis:

$$w(i,j)=avg(j)/avg(i)$$

(b) what's-different analysis:

$$w(i,j)=(avg(j)-avg'(j))/(avg(i)-avg'(i))$$

(Note that re-normalization may be necessary to ensure that $w(i,j)$ lies between 0 and 1.)

(c) correlation analysis. Here, $w(i,j)$ is the absolute value of the cross correlation between $X(i)$ and $x(j)$ for data collected when a performance problem is present.

There are two components to a diagnostic result. The first is a path in the MNG. These paths, or explanations, describe how dependencies between measurement variables explain performance problems. For example, in FIG. 7, an explanation might be the path RTTOT→SJCPU→TRCPU. The second component of a diagnostic result is a quantification of the importance of the explanation, referred to as the path's explanatory power. A larger value of explanatory power indicates an explanation that accounts for more of the performance problem in the detection variable ($x(0)$). Let uP be the explanatory power for path P. The value uP is the product of the arc weights in the path P. For example, in FIG. 7 the explanatory power of the path RTTOT→SJCPU→TRCPU is 0.06. Note that by restricting arc weights to be between 0 and the following is assured:

If P' is a sub-path of P, then uP' is no larger than uP.

To summarize the operation of the QPD method used in the FIG. 2 architecture, the method takes as input: (a) measurement data, (b) an MNG representation of the target system, and (c) a threshold criteria THRpth that is the minimum uP for a path. The method outputs a set of order pairs of the form (P, uP). This set constitutes the diagnostic results.

Figure 8A:
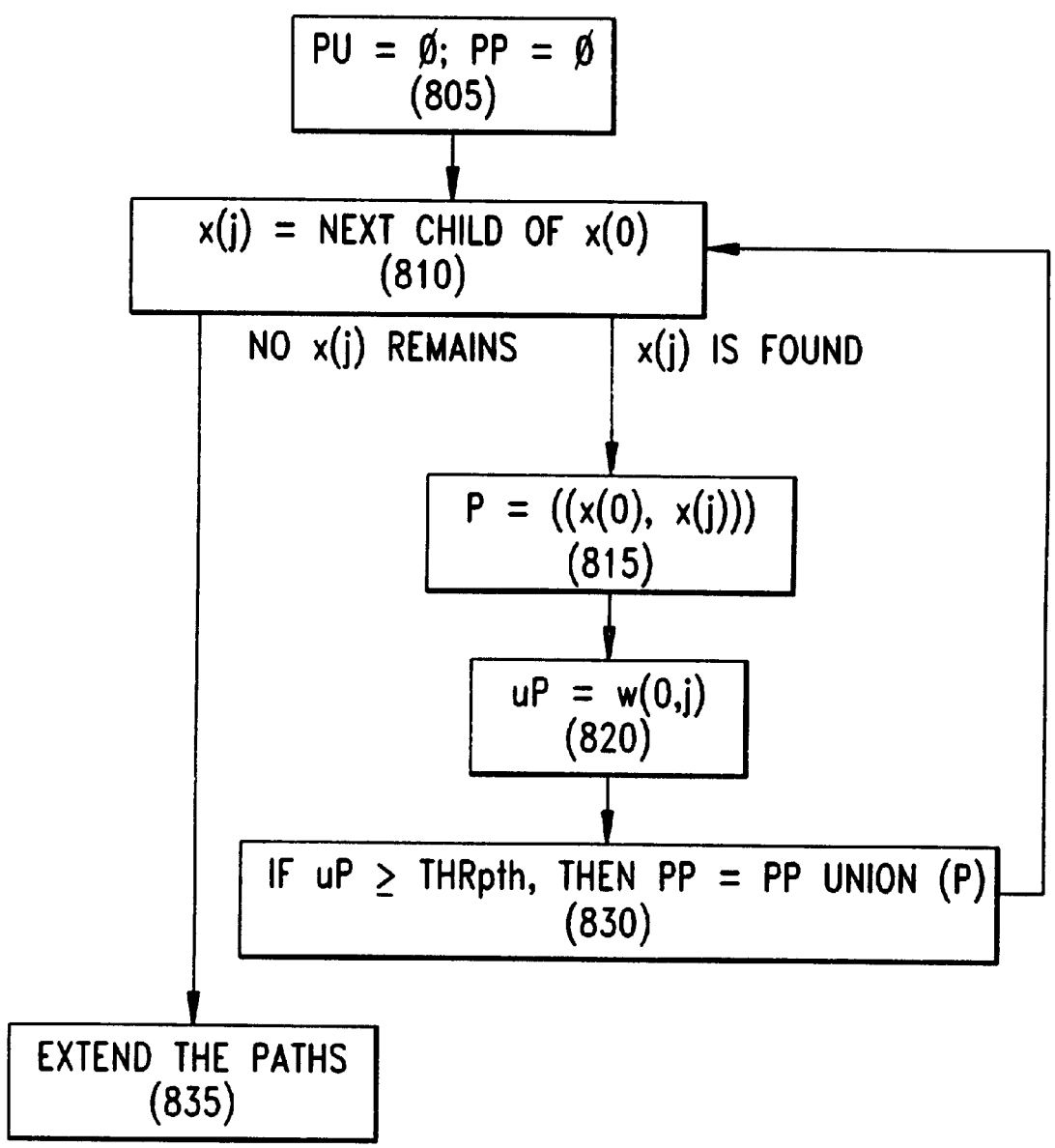
FIG. 8a describes the first phase of the QPD method of the present invention which phase performs initialization and construction of initial paths.

The QPD method or process flow is structured into two phases. The first is initialization and establishment of initial paths (explanations) in the MNG. In FIG. 8a, (805) specifies the initialization step in which the set of diagnostic results is denoted by PU, and the set of paths to be processed is denoted by PP. Step (810) begins the steps for establishing initial paths by extracting a child of the root of the MNG. If all paths have already been processed, the process proceeds with the next phase in (835). Otherwise, the process proceeds with the child variable found. In (815), this child variable, which is denoted by $x(j)$, is used to construct a one-arc path. In (820), the weight of this arc is computed using diagnostic techniques embedded in the process flow. In (830), a check is made to determine if the explanatory power of the one-arc path exceeds the user-specified criteria stored in THRpth. If it does, then P is included in PP.

Figure 8B:
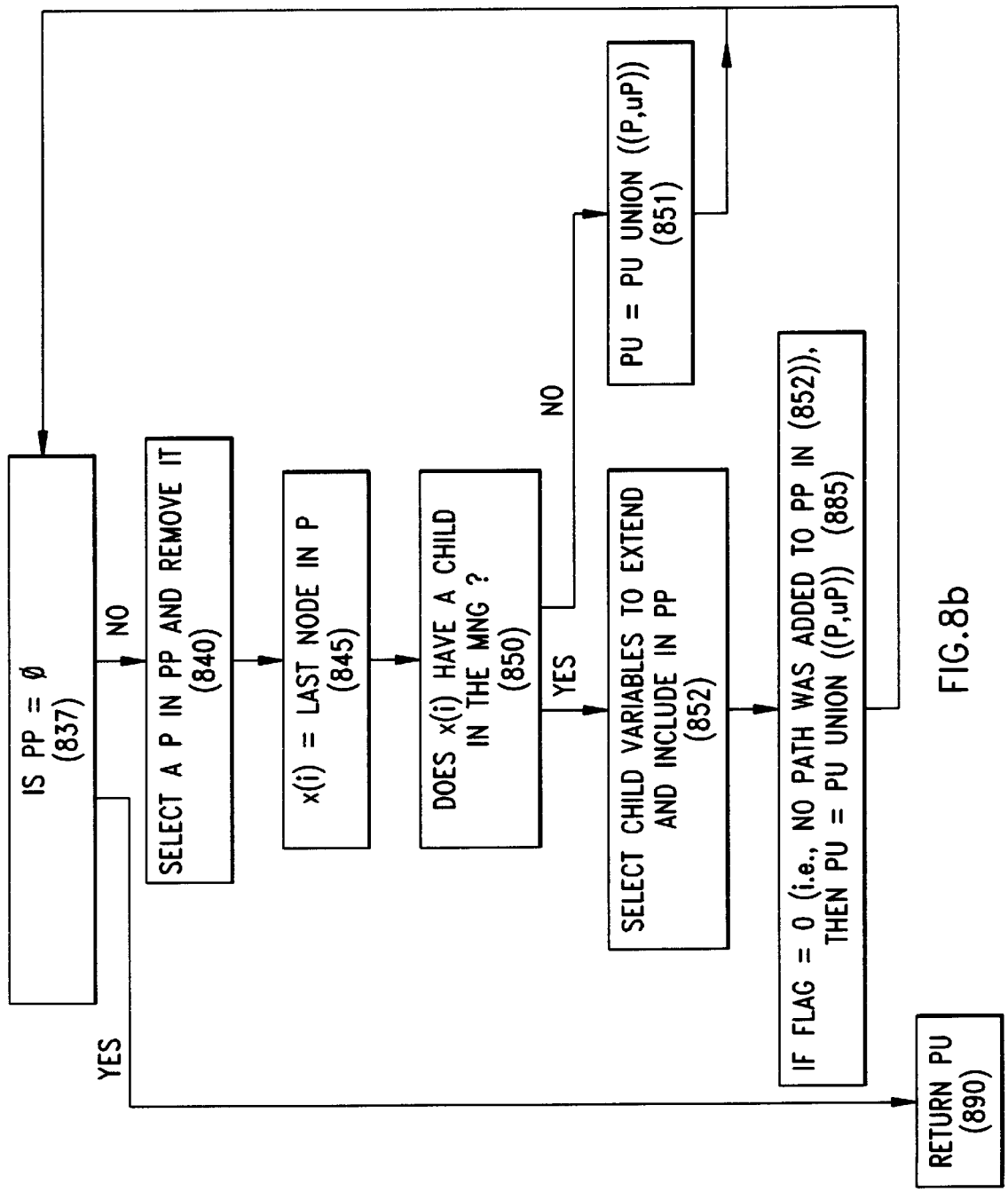
FIG. 8b depicts the second phase of the QPD method of the present invention in which paths are extended.

FIG. 8b describes the second phase in the QPD process flow herein embodied which phase extends the set of initial paths. In (837), there is a check to see if the set of paths being examined (PP) is empty. If it is, processing is completed, the process returns PU as the diagnostic results. If not, (840) selects a P in PP and removes it. In (845), the last node in the selected path is obtained. This node is denoted by $x(i)$. In (850), it is determined if $x(i)$ has a child in the MNG. If it does not, then (851) adds (P,uP) to PU, and processing resumes at step (837). If $x(i)$ does have at least one child, the process proceeds to (852) in which a decision is made as to which paths from $x(i)$ should be appended to P. In (885), a check is made to determine if any extension to P was made in (852). If none was, then (P,uP) is added to PU. In either case, processing continues at step (837).

Figure 8C:
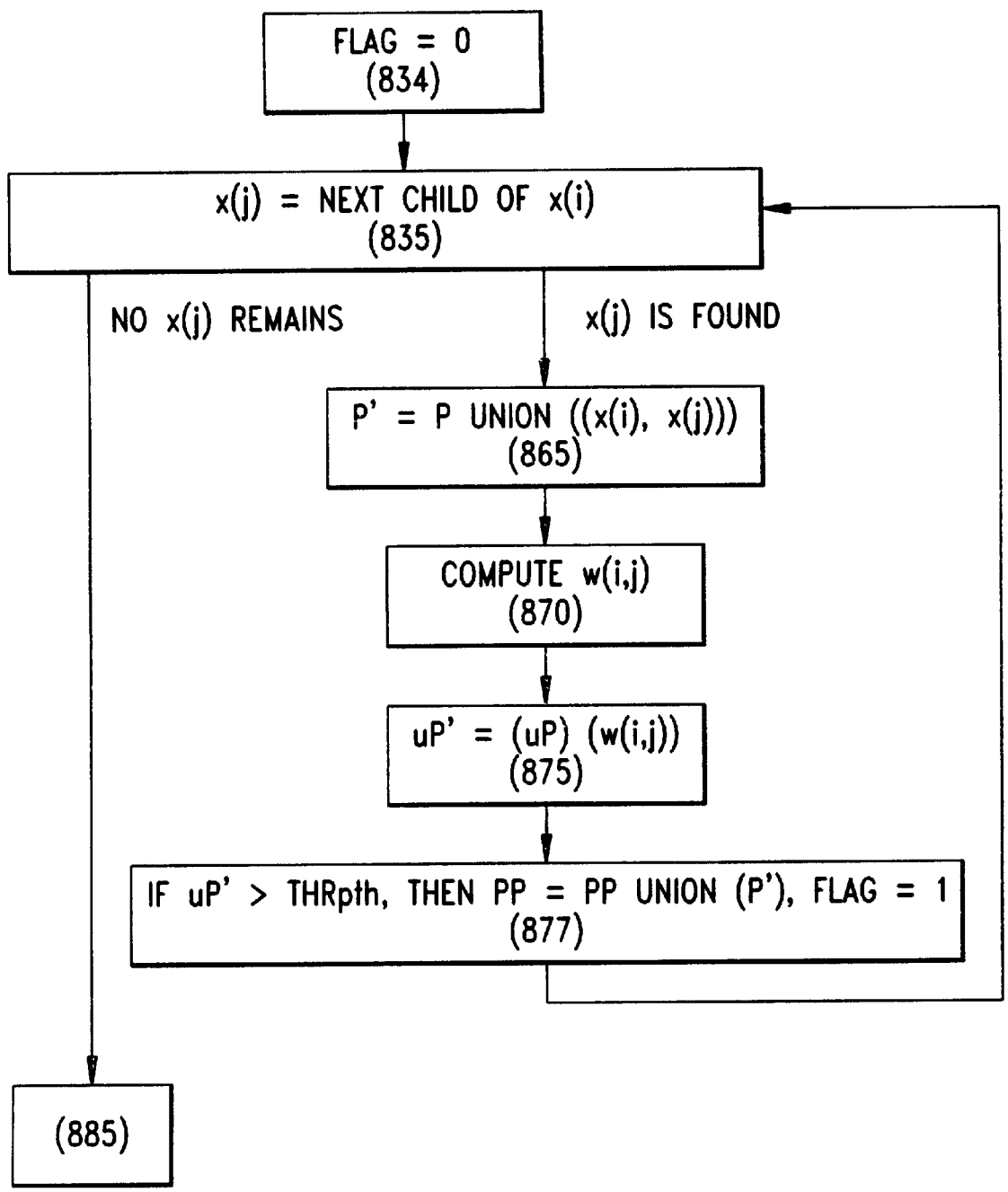
FIG. 8c elaborates on a portion of the third phase of the present invention wherein child variables are selected to determine which paths are to be extended.

FIG. 8c elaborates on step (852) of FIG. 8b that shows how child variables of $x(i)$ are selected to construct new paths by extending P. In (854), flag is initialized to 0 to indicate that PP has not changed. In (855), the next child of $x(i)$ is selected from (850). If an $x(j)$ remains that has not been selected in this loop, the process proceeds with (865). Otherwise, the process goes to step (885). In (865), a new path, P', is constructed by extending P with the arc $(x(i),x(j))$. In (870), $w(i,j)$, is computed, and, in (875), uP' is calculated. In (877), it is determined if the explanatory power of uP' meets the user-specified criteria of THRpth. If it does, P' is included in PP and flag is set to 1 to indicate that PP has changed. Processing resumes at (855).

FIG. 9 displays the results of applying the QPD process flow described in FIGS. 8a, 8b, 8c to the example displayed in FIG. 7, using $x(0)$=RTTOT and THRpth=0.05. The heavy lines in FIG. 7 indicate the arcs traversed in the process flow. Note that no arc is traversed from TRCPU to its children since the resulting path from RTTOT would have an explanatory power less than 0.05. The threshold for explanatory power is THRpth, which, as noted above, is one of the inputs to the diagnosis process flow.

It is to be noted that, in FIG. 9, all paths originate at RTTOT, which is the detection variable. This feature allows generation of textual explanations of performance problems. For example, consider the path RTTOT→SJCPU→STCPU→STCPU_1. Given this path and its uP, it is relatively easy for a decision support tool to generate text that explains how STCPU_1 contributes to increased response times. For example, assuming that there are data dictionaries that associate variable names with text strings:

User 1 accounts for 22% of the increase in response time. The reason is as follows:

User 1 accounts for 90% of the increase in CPU service time;

CPU service time accounts for 80% of the increased time in the CPU subsystem; and Time in the CPU subsystem accounts for 30% of the increase in response time.

A second architecture for diagnostic systems, motivated by a desire to externalize the choice of diagnostic techniques, will now be described with reference to FIG. 3. Externalization is done for two reasons. First, the preferred diagnostic technique depends on the nature of the functional relationship between parent and child variables, which cannot readily be deduced by the diagnosis engine. Therefore, the information must be supplied externally. Second, end-users may have preferences as to the choice of diagnostic technique. Hence, it is desirable to provide a system with flexibility as to diagnostic techniques used for each parent variable.

Figure 3:
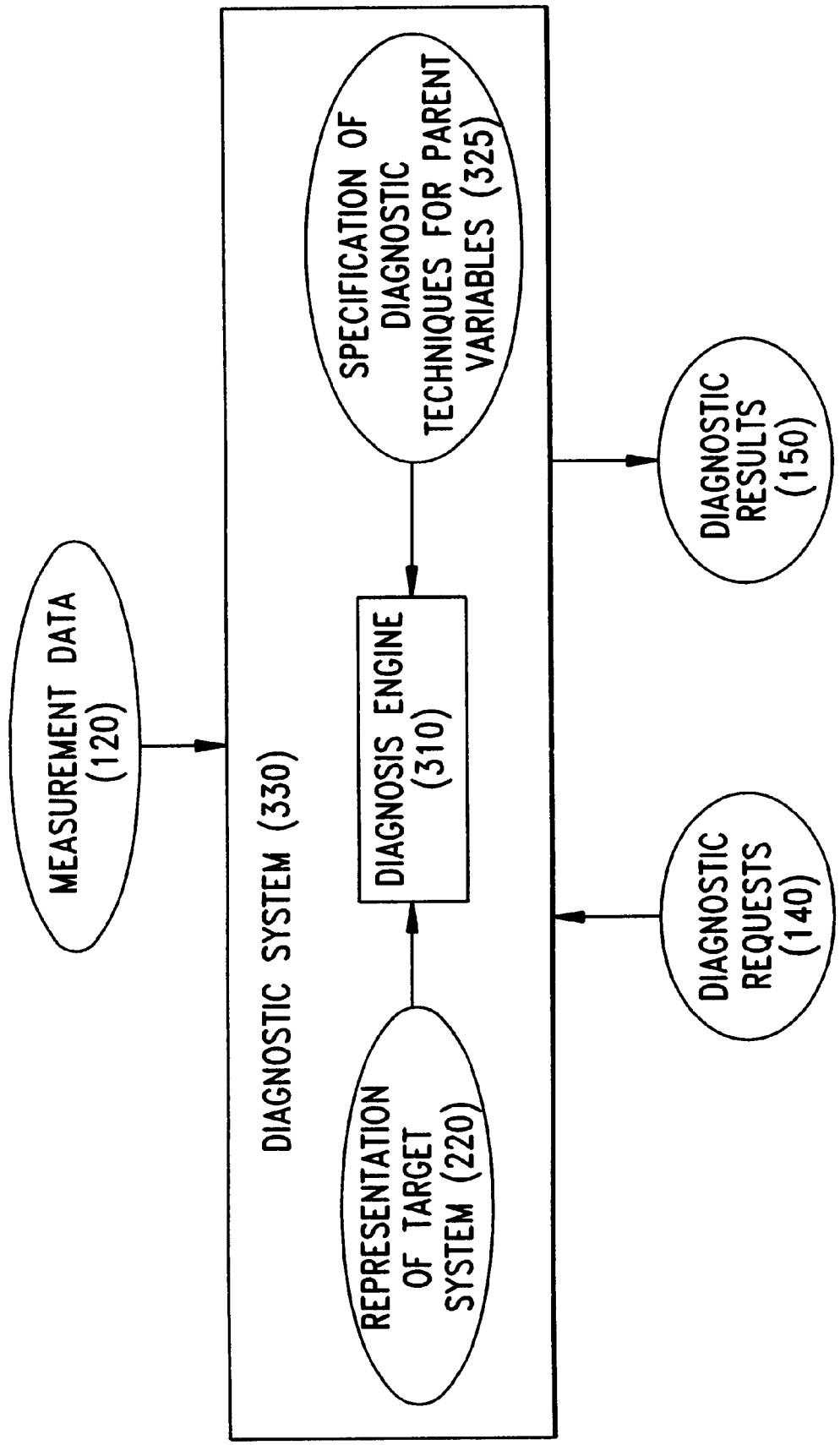
FIG. 3 shows a second architecture considered for a diagnosis system in which the choice of diagnostic techniques is specified in a manner that is external to the diagnosis engine and the target system is represented externally.
Figure 10:
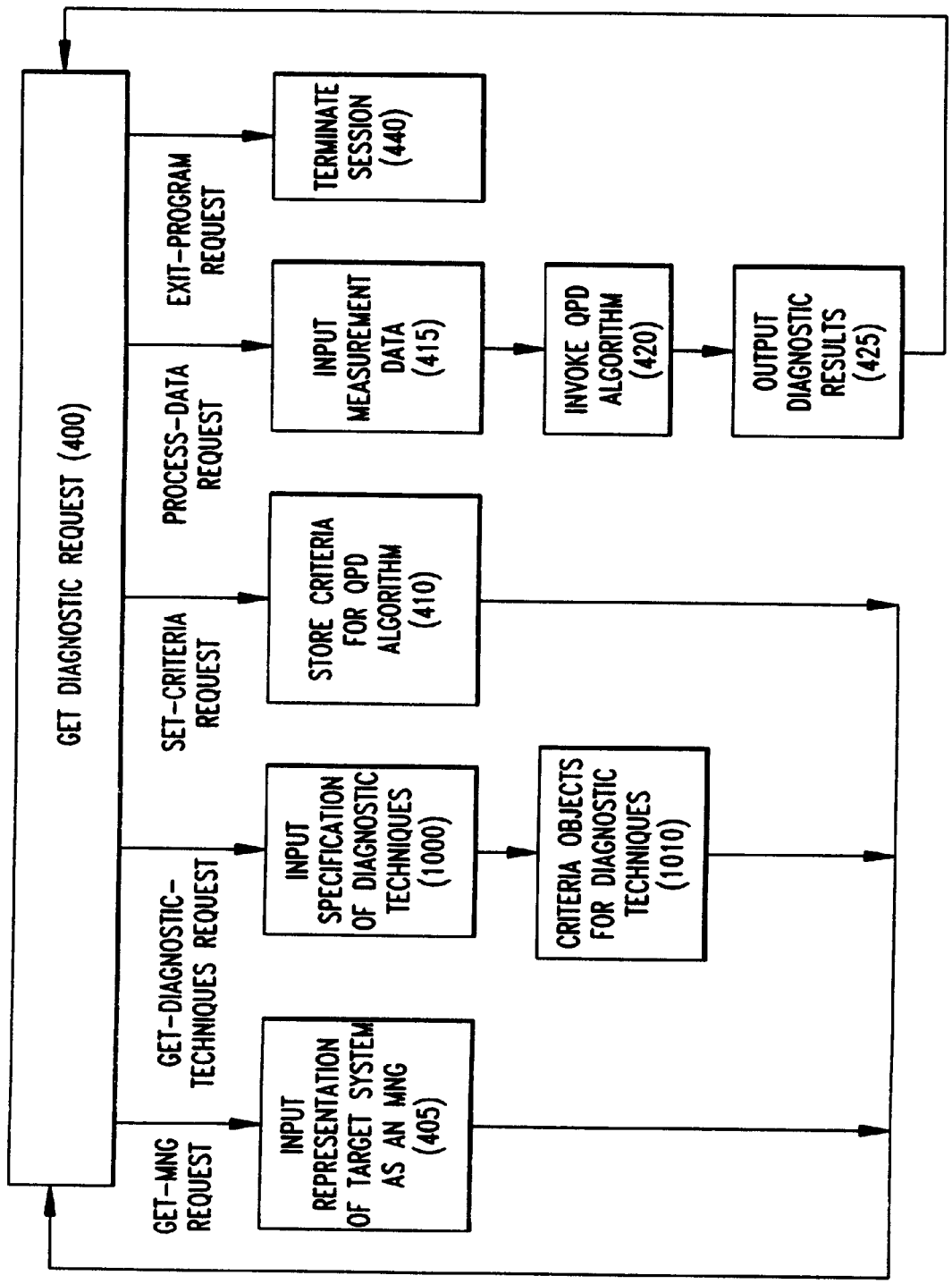
FIG. 10 displays the method used in the FIG. 3 architecture for QPD.

FIG. 3 depicts the architecture envisioned. The diagnosis engine (310) takes diagnostic requests from the end-user, measurement data, a representation of the target system, and a specification of the diagnostic techniques for parent variables (325) as input. FIG. 10 displays the method used in the FIG. 3 architecture, which is an extension of the FIG. 4 method used in the FIG. 2 architecture. These extensions relate to the get-diagnostic-techniques diagnostic request. Such requests are processed by first inputting the specification of diagnostic techniques (1000) and then creating objects for these diagnostic techniques (1010). Employing an external representation of diagnostic techniques also affects the QPD method in (420).

To specify the diagnostic techniques, it suffices to indicate an associated diagnostic technique for each parent variable in the MNG. FIG. 11 applies this approach to the described running example. For example, the parent variable RTTOT uses bottleneck analysis (BA), which would be a reasonable choice since its child variables sum to RTTOT. On the other hand, SJCPU uses correlation analysis (CA) as its diagnostic technique since the relationship with its children is not additive. STIO employs what's-different analysis (WDA) since (a) it has a linear relationship with its children and (b) reference data are available. From the foregoing discussion, it can be seen that (1000) in FIG. 10 only involves reading a text file with two columns and creating an in-memory representation of this tabular structure.

Step (1010) in FIG. 10 requires defining a representation of diagnostic techniques and instantiating this representation in a way which allows the QPD method to compute arc weights. The described embodiment uses an object-oriented approach. FIG. 12 specifies the methods and data members for a class that represents a diagnostic technique. The addProblemData and addReferenceData methods only require storing data in an array. The computeArcWeight method is implemented in a manner that is specific to the diagnostic technique employed, using well-known computations such as those discussed earlier. The data members are in-memory storage areas.

Figure 13:
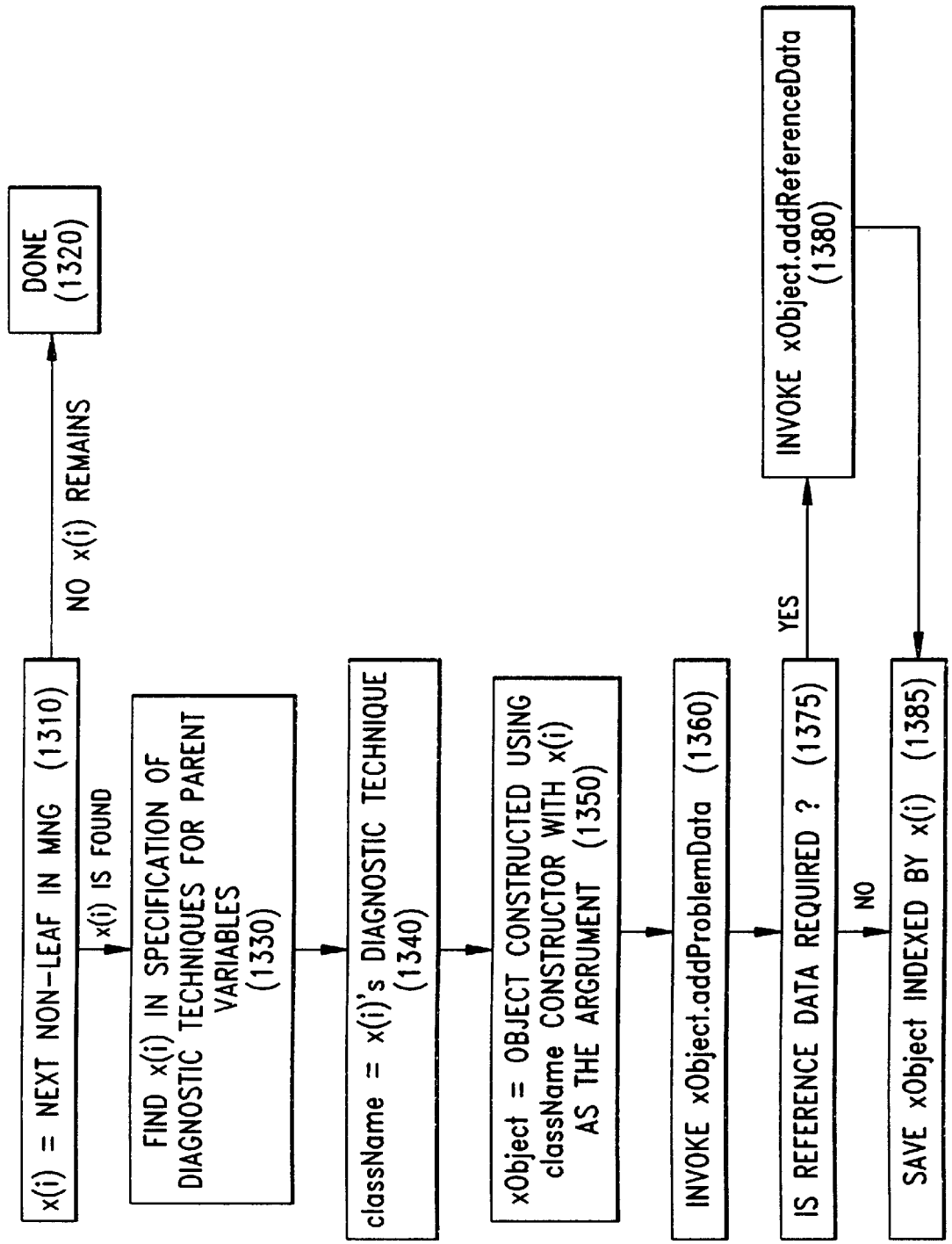
FIG. 13 describes the steps in creating objects for diagnostic techniques based on an external specification such as that in FIG. 11.

FIG. 13 describes how objects for diagnostic techniques are created as required in step (1010) in FIG. 10. In (1310), the next non-leaf in the MNG is examined. If none remains, then processing is completed (1320). Otherwise, in (1330) x(i) is located in the specification of the diagnostic techniques. In (1340), a class name is obtained for x(i)'s diagnostic technique. This class has all the methods and data members listed in FIG. 12, and its computeArcWeight method implements the diagnostic technique specified. In (1350), an object is constructed for this class to represent x(i). In (1360), data are provided that indicate x(i)'s values during the performance problem. (If these data are unavailable at this time or are changed subsequently, this step can be executed later). In (1375), a check is made to see if the diagnostic technique requires reference data as well. If so, in (1380) reference data are added to the object (with the same considerations as those for problem data). In (1385), the object is saved in such a way that it can be retrieved subsequently, if x(i) is known.

Figure 14:
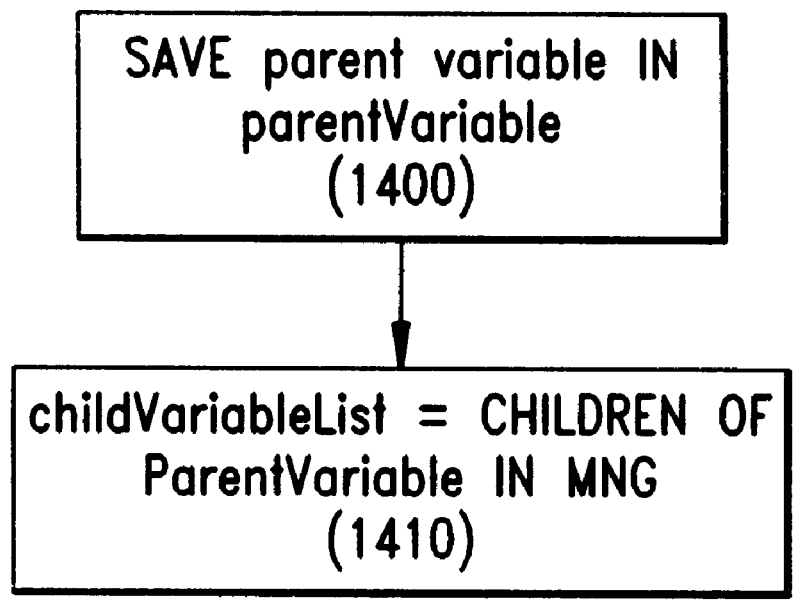
FIG. 14 lists the steps employed in constructing a diagnostic technique object.

FIG. 14 specifies the operation of the constructor for the diagnostic technique object as used in (1350). In (1400), the parent variable is saved in the parentVariable data member. In (1410), the children of the parent variable in the MNG are saved in the childVariableList data member.

Figure 15:
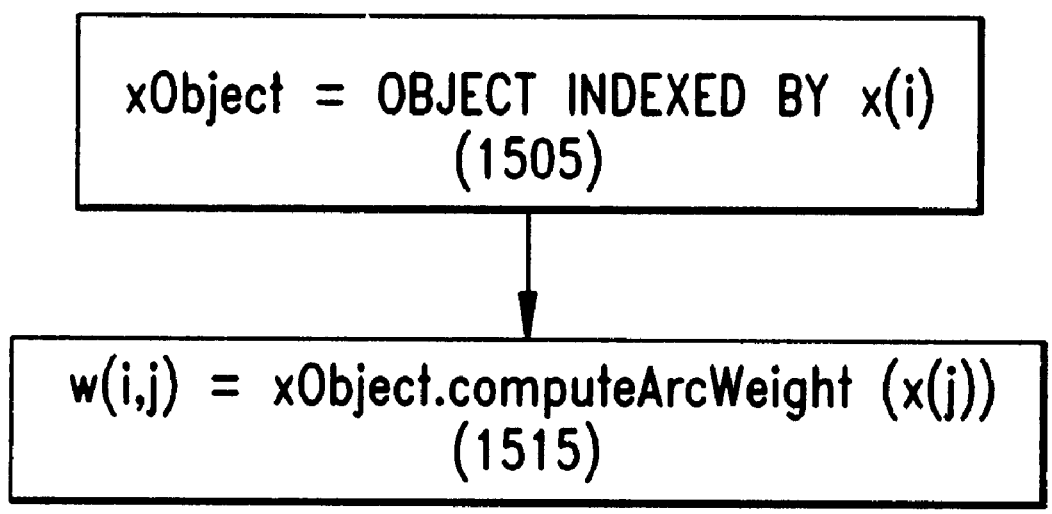
FIG. 15 shows how to compute arc weights using the object representation of diagnostic techniques.

The final consideration for the embodiment of the architecture in FIG. 3 is showing how the QPD process must be modified. Observe that only the computation of arc weights is affected. That is, step (820) in FIG. 8a and step (870) in FIG. 8c. In both cases, x(i) and x(j) are known. Thus, the process proceeds as in FIG. 15. In (1505), the diagnostic technique object corresponding to x(i) is located (since these objects were indexed when they were constructed). Then, the computeArcWeight method for this object is invoked, which returns w(i,j).

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. An apparatus for quantitative performance diagnosis that employs an external representation of information about a target system being diagnosed and the diagnostic system, comprising:

(a) at least one representation of the target system as a measurement navigation graph consisting of nodes that are measurement variables and arcs that specify decompositions of measurement variables, wherein at least one measurement variable has two incoming arcs and the measurement navigation graph is annotated with numerical arc weights; and (b) at least one diagnosis engine that receives performance information about said target system and computes quantitative diagnoses of performance problems by applying said performance information to said at least one representation of the target system.

2. A method for performing quantitative performance diagnosis of a target system comprising the steps of:

(a) providing at least one representation of the target system as a measurement navigation graph having nodes connected by arcs;

(b) inputting measurement variables collected from the target system to said measurement navigation graph;

(c) assigning numerical weights to said arcs in said measurement navigation graph;

(d) computing diagnostic results based on paths in said measurement navigation graph that have the largest explanatory power as computed from said weights; and (e) outputting said diagnostic results.

3. The method of claim 2 wherein said providing further comprises:

receiving outside input; and deriving said measurement navigation graph representation of the target system based upon said input.

4. The method of claim 3 wherein said assigning of weights comprises calculating weights based on said input.

5. An apparatus for quantitative performance diagnosis that employs an external representation of information about a target system being diagnosed and external representations of at least one diagnostic techniques that specify how to quantify contributions of child variables to performance problems present in parent variables, comprising:

(a) at least one representation of the target system as a measurement navigation graph;

(b) a plurality of externally specified diagnostic techniques that compute weights for arcs in said measurement navigation graph; and (c) a diagnosis engine that receives performance information about said target system and uses the representation of the target system and the externally specified diagnostic techniques to produce quantitative diagnoses of performance problems from said performance information.

6. A method for performing quantitative performance diagnosis of a target system comprising the steps of:

(a) providing a representation of the target system as a measurement navigation graph having nodes and connecting arcs;

(b) inputting at least one diagnostic technique;

(c) inputting measurement data collected from the target system;

(d) applying said at least one diagnostic technique to the input data to compute weights for arcs in the measurement navigation graph; and (e) determining the paths in the measurement navigation graph which have the largest explanatory power as computed from the arc weights.

7. In the method of claim 6 wherein said graph includes at least two non-leaf nodes connected by arcs to more than one leaf node and wherein more than one diagnostic technique are input, said applying comprising invoking one of said more than one diagnostic technique to all measurement data associated with arcs off of a non-leaf node.

8. A program storage device readable by machine, tangibly embodying a program of instructions executable by the machine to perform method steps for performing quantitative performance diagnosis of a target system, said method steps comprising:

(a) providing at least one representation of the target system as a measurement navigation graph having nodes connected by arcs;

(b) inputting measurement variables collected from the target system to said measurement navigation graph;

(c) assigning numerical weights to said arcs in said measurement navigation graph;

(d) computing diagnostic results based on paths in said measurement navigation graph that have the largest explanatory power as computed from said weights; and (e) outputting said diagnostic results.

9. The program storage device of claim 8 wherein said step of providing further comprises:

receiving outside input; and deriving said measurement navigation graph representation of the target system based upon said input.

10. The program storage device of claim 9 wherein said step of assigning of weights comprises calculating weights based on said input.

11. A program storage device readable by machine, tangibly embodying a program of instructions executable by the machine to perform method steps for performing quantitative performance diagnosis of a target system, said method steps comprising:

(a) providing a representation of the target system as a measurement navigation graph having nodes and connecting arcs;

(b) inputting at least one diagnostic technique;

(c) inputting measurement data collected from the target system;

(d) applying said at least one diagnostic technique to the input data to compute weights for arcs in the measurement navigation graph, and (e) determining the paths in the measurement navigation graph which have the largest explanatory power as computed from the arc weights.

12. The program storage device of claim 11 wherein said graph includes at least two non-leaf nodes connected by arcs to more than one leaf node and wherein more than one diagnostic technique are input, said applying comprising invoking one of said more than one diagnostic technique to all measurement data associated with arcs off of a non-leaf node.

* * * * *